(12) United States Patent
Meek

(10) Patent No.: US 9,729,823 B2
(45) Date of Patent: *Aug. 8, 2017

(54) PUBLIC COLLABORATION SYSTEM

(71) Applicant: ONE ROOM LIMITED, Auckland (NZ)

(72) Inventor: Craig Alexander Meek, Auckland (NZ)

(73) Assignee: One Room Limited, Auckland (NZ)

( * ) Notice: Subject to any disclaimer, the term of this patent is extended or adjusted under 35 U.S.C. 154(b) by 204 days.

This patent is subject to a terminal disclaimer.

(21) Appl. No.: 14/727,738

(22) Filed: Jun. 1, 2015

(65) Prior Publication Data

US 2016/0021339 A1 Jan. 21, 2016

Related U.S. Application Data

(63) Continuation of application No. 13/575,794, filed as application No. PCT/NZ2011/000020 on Feb. 11, 2011, now Pat. No. 9,077,849.

(30) Foreign Application Priority Data

Feb. 12, 2010 (NZ) ........................................ 583293
Nov. 11, 2010 (NZ) ....................................... 589186

(51) Int. Cl.
| | |
|---|---|
| *H04N 7/14* | (2006.01) |
| *H04N 7/15* | (2006.01) |
| *G06Q 10/06* | (2012.01) |
| *H04L 29/06* | (2006.01) |
| *G06F 3/0481* | (2013.01) |
| *G06F 3/0482* | (2013.01) |
| *G06F 3/0485* | (2013.01) |

(52) U.S. Cl.
CPC ............. *H04N 7/15* (2013.01); *G06F 3/0482* (2013.01); *G06F 3/0485* (2013.01); *G06F 3/04817* (2013.01); *G06Q 10/06* (2013.01); *H04L 65/403* (2013.01); *H04L 65/4038* (2013.01); *H04L 65/4053* (2013.01)

(58) Field of Classification Search
CPC ........................................................ H04N 7/14
USPC ..................... 348/14.01, 14.03, 14.07, 14.08
See application file for complete search history.

(56) References Cited

U.S. PATENT DOCUMENTS

| | | | |
|---|---|---|---|
| 5,440,624 A | 8/1995 | Schoof, II | |
| 7,499,969 B1 * | 3/2009 | van Os | .......... H04M 3/56 709/203 |
| 8,091,029 B1 | 1/2012 | Gay et al. | |
| 8,144,633 B2 | 3/2012 | Yoakum et al. | |
| 2004/0047461 A1 | 3/2004 | Weisman et al. | |
| 2007/0165105 A1 | 7/2007 | Lengeling et al. | |
| 2008/0065447 A1 | 3/2008 | Evanchik et al. | |
| 2009/0027483 A1 | 1/2009 | Sakai | |
| 2009/0094532 A1 | 4/2009 | Lyle et al. | |

(Continued)

*Primary Examiner* — Olisa Anwah
(74) *Attorney, Agent, or Firm* — Tsircou Law, PC

(57) ABSTRACT

A meeting management system for managing the conduct of a meeting online provides the functionality to arrange order of the presenters during a meeting (208), to show the participants in the meeting (206-213) and the content presented by them (216), the 5 relative order of the participants as regards the meeting progress, the timeline of the meeting, and to legally record the total proceedings of the meeting. The participants appear as a rotatable "carousel" of icons.

14 Claims, 6 Drawing Sheets

(56) References Cited

U.S. PATENT DOCUMENTS

| | | |
|---|---|---|
| 2009/0210789 A1 | 8/2009 | Thakkar et al. |
| 2010/0037151 A1 | 2/2010 | Ackerman et al. |
| 2010/0318399 A1 | 12/2010 | Li et al. |
| 2011/0113348 A1 | 5/2011 | Twiss et al. |
| 2011/0141951 A1 | 6/2011 | Ramachandran et al. |

* cited by examiner

Meeting Name and Date Time

| Speaker Name | Time to Start |
|---|---|
| *Tom Jones* | *1.15 pm* |
| Douglas Wilcock | 1.22 pm |
| Paul Strathmore | 1.30 pm |
| Jane Hildegaard | 1.39 pm |

Meeting Name, Agenda

1. Agenda item one Speaker A
2. Agenda item two Speaker C/Speaker D
3. *Agenda item three Speaker E*
4. Agenda item four Speaker C/Speaker B
5. Agenda item five Speaker F Reference material: Search [meeting planner]

Meeting planners: Find venues and organize seminars with Redumuk... Directory of business tourism and meeting planners. Plan your business events and find incentive, ... Sign up to our e-newsletter. Destination Guide ... www.redumuk.com/ - United States - Cached - Similar Florida Meeting Planners Guide - South Florida Meeting Facility ... Healt Regency Sarasota - official site. Allow us to pamper your with first-class service and our exclusive Florida meeting planners guide. sarasota, healt.com/healt/hotels/events/index.jsp - Cached - Similar

FIG. 2

PUBLIC COLLABORATION SYSTEM

CROSS REFERENCE TO RELATED APPLICATION

This application is a continuation of U.S. application Ser. No. 13/575,794, filed Oct. 18, 2012, which claims priority to PCT App. No, NZ2011/000020, filed Feb. 11, 2011, New Zealand Pat App. No. 589186, filed Nov. 11, 2010 , and New Zealand Pat App. No. 583293, filed Feb. 12, 2010, which are incorporated by reference for all purposes

FIELD OF THE INVENTION

The invention generally relates to a public collaboration system and in particular to video conferencing systems.

More particularly the invention relates to video conferencing systems with a large number of participants where a management system is provided to prioritize the progress of the conference. Examples of this include internet seminars or meetings also known as "webinars", on-line concerts, corporate meetings, lectures, and seminars over the internet or fixed lines, and any form of video conference over the internet or over dedicated lines or private networks which may involve the interaction of two or more persons.

BACKGROUND OF THE INVENTION

Video conferencing systems are known in which an icon or thumbnail image of each of the participants is provided on a conferencing screen. Typically such icons are arranged in no particular order (for instance in order of joining the conference) which can make it difficult for a conference organizer to identify the next presenter or to change the presentation order.

This identification and prioritization task can become much more difficult where the conference is a constituted meeting of many persons, for instance the AGM of a large distributed company. The mere placing on screen of the icons of those joining the meeting may require more screen space than is available, resulting in the exclusion of some icons from the screen. The problem of identifying a participant wishing to speak and organizing them into the speaking order provides additional problems of advising each person who is already in the speaking order of any changes and keeping participants aware of any changes in the meeting process.

Therefore, a need exists for a solution to the problem of managing the placement of icons of those participating in a video conference and of managing the processes of the conference in such a way that participants can be easily made aware of them.

The present invention provides a solution to this and other problems which offers advantages over the prior art or which will at least provide the public with a useful choice.

To this end, it is an object of the invention to provide a method of presenting to participants in a video conference or meeting an indication of the current and future progression of the conference or meeting in a manner, which is unobtrusive in relation to the content of the video conference.

The terms "meeting" and "conference" are used interchangeably within the specification with the inference that a "meeting" may be formally structured and recorded while a "conference" may not be.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or

SUMMARY OF THE INVENTION

In one exemplification the invention consists in a method of presenting video conference management information by: providing a display of the conference content; providing a display of icons representing at least some of the participants in the conference; prioritizing the appearance of the icons on the icon display in terms of conference processes; nominating a participant as a conference prioritizer; and providing an icon appearance prioritizer to the conference prioritizer.

Preferably, the icons are prioritized to appear in order of a presentation to be made by the participants.

Preferably, the conference prioritizer decides the presentation order as a means of prioritizing the icons.

Preferably, the icons act as links providing access to communication between conference prioritizer and participants or vice versa.

In an alternative embodiment the invention consists in a video conference managing system including a participant prioritizer for a video conference comprising: an icon generator capable of generating an on screen icon for each conference participant; an icon location prioritizer prioritizing the location in which at least more than one screen icon appears on screen; and a user interface to the icon location prioritizer providing a user priority adjuster amending the priority of an on screen icon.

Preferably, each participant has a participant profile and the user interface provides a participant profile editor.

Preferably, an associator provides an association between each on screen icon and a viewable version of the participant profile.

In a further alternative embodiment the invention consists in a video conference data storage and management system including a video conference information storage system storing information to be presented or being presented at a video conference, a conference participant information system storing information relating to persons participating in the video conference, a video conference timeline management system distributing (e.g., advertising) the timeline of a video conference, a video conference control management system setting the order of presentation of conference presenters at a video conference, and associating with the presenter the information to be presented by the presenter, a participant icon display orderable to indicate the relevance of the participant to the conference, a conference recording system providing a record of proceedings at the conference.

Preferably, where the conference is a meeting of an organization or company the conference recording system meets legal standards for recording the conduct of such meetings.

These and other features of as well as advantages, which characterize the present invention, will be apparent upon reading of the following detailed description and review of the associated drawings.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 2 is a diagram of the moderator screen for the conference call management.

FIG. 1

DETAILED DESCRIPTION OF THE PREFERRED EMBODIMENTS

The invention is described here in relation to a secure video conference or meeting recorder capable of recording all input to a meeting, and all proceedings at a meeting in a manner, which meets the legal requirements for tax authorities, stock exchange reporting, and evidence before a court. As part of this meeting, it may be required to set an agenda and to provide for the presentation of reports, the questioning of these reports, the making of motions and remits, amendments to these motions and remits, the supply of documents supporting any of these, the recording and counting of votes and multiple other minutae. Different types of meeting will require differing combinations of elements, but in all cases, there is normally one person in control of the meeting.

Further, if the video meeting is to be capable of managing a large number of participants it must use readily available components and must make use of readily available bandwidth and programs to provide audio and, video to the participants.

This description therefore describes a system based on internet browser use by the participants and an internet cloud basis for the processing intensive portions of the system, which system is nonetheless secure and provides a complete record of the meeting.

Figure 1:
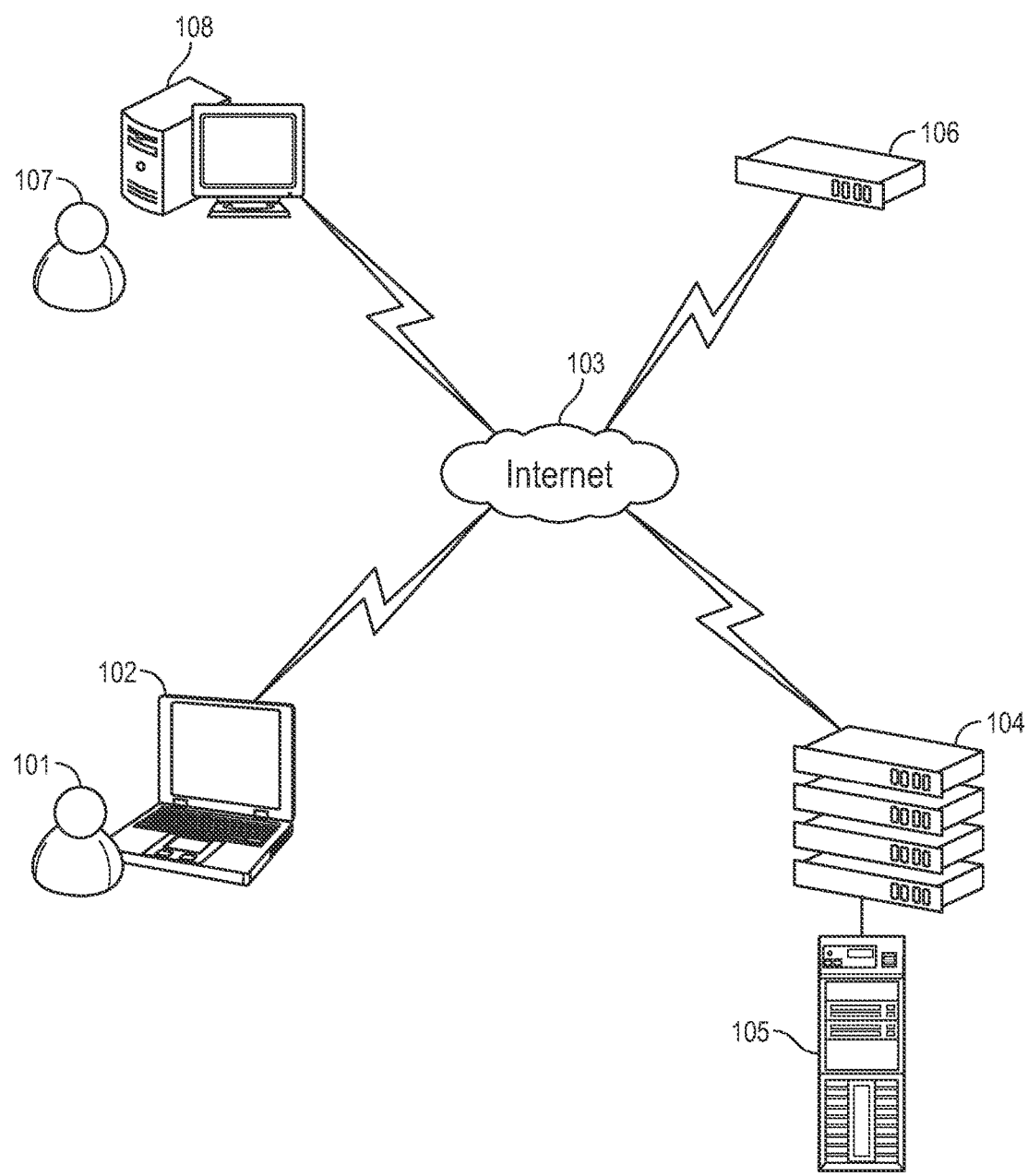
FIG. 1 is a diagram of the network required for the conference call management.

To this end FIG. 1 shows the infrastructure required to host such a meeting in which one of many participants 101 sits before a computing device 102 with video facilities communicates through a web browser via a web cloud 103 with servers 104 and a secure hard disk storage facility 105. The servers may include a search server for data from previous meetings or collaborative sessions or data, which will support or inform the present meeting. Ancillary servers such as mail server 106 may be provided for dissemination of additional information to the participants of the meeting. The servers each carry out well known functions, such as data storage and serving, web services, mail servers, web servers but the data served is accessed via a centralized interface under control of a meeting moderator or host. Since the data stored may be in many differing formats, because the individuals contributing to the meeting may be from a variety of differing backgrounds and organizations, it is necessary that the data served from a data storage server, or library, be served in a format acceptable to all participants in a meeting. This requires some form of streaming output conversion for the stored data to common formats such as PDF, Word, HTML, etc. It further requires that any data stored be indexed in order that it can be located, so a data store is accompanied by a document indexer capable of indexing the diverse documents to be found in the library.

A meeting moderator or host or chairman or prioritizer 107 interacts with a browser interface in computer 108 to control the presentation or prioritization of the meeting as regards timeline, presenters, their associated information, the handling of questions, votes, etc.

FIG. 2 shows one of the moderators views of a meeting in progress, in which a meeting screen 201 shows the meeting name, for instance "Oleander Pacific AGM" with a start time of "May 12, 2010 1.00 pm EST" at 202.

An icon bar 203 carries icons of those participants who are logged in for the meeting, though it is to be understood that the order of the icons is prioritized so that those most intimately concerned with the meeting appear at one end, in this instance the left, while those who may merely be observing may be beyond the end of the icon bar to the right. The system will locate or relocate the participants based on their degree of interactivity with the meeting as it progresses, so that more active participants will always tend to be on the visible part of the icon bar while more inactive participants will not be shown on the screen (though viewable by scrolling the icon bar).

Below the icon bar are information windows, in this instance two windows 204 and 205. Window 204 is showing the speaker order and window 205 the agenda for the meeting.

The icon bar shows at the extreme left an icon of the moderator at 206. This icon is present in this position from the time the moderator logs in to the formative meeting until the meeting is completed, though of course the position of moderator or chairman may be delegated to others as the meeting progresses, in which case the delegate appears beside the moderator.

Next to the moderator, and arranged in order of presenting to the meeting, are the current speaker 207, whose name appears emphasized at 208 in window 204, and the following speakers 209, 210, 211 whose names appear below the first together with their speaking time in window 204. Each speaker name appearing in the list in window 204 may be a browser link to the material being presented by the speaker, thus at an AGM the presidents presentation may link to the presidents report. The links may all relate to material held in secure storage 105 and served by servers 104 or they may relate to external material found by or available to the presenter and approved for presentation to the meeting.

Following the allocated speakers, from icon 212 onwards, are the remainder of the meeting participants in no particular order, except that personalized icons may precede default icons such as 213 and 210.

A window 205 currently shows the meeting agenda, again the current item, number 3 is emphasized to show the progress of the meeting. The agenda items may be browser links to material relevant to the agenda item, for instance, they may link to financial reports, recorded presentations, graphs, email messages, or any other material held in secure storage 105 and served by servers 104. Where a motion is moved within an agenda item the text of the motion may be entered and shown, amendments to a motion shown; and votes for/against/abstentions may be shown when the participants are electronically polled via the browser.

Icons in the icon bar 203 may also be associated with links. Typically hovering over an icon will produce a precis of the participant's job position and firm produced from JavaScript in the browser source code and extracted from a user database accessible from servers 104.

For the moderator, the icon link may offer a video interface, or chat interface to that person, allowing discussion of a place in the speaking list or some contribution to the documents attached to an agenda item.

Similarly, at the participant's end where the same icon bar may be shown, the icon link for the moderator may allow sending a message or opening a video link to the moderator to discuss a contribution to the meeting. A section of the icon bar may be dedicated to showing the icons of persons queuing to await a response from the moderator.

A search screen 215 allows searching of the information accessible from the meeting screen, whether this be external documents, media clips, internal data, or other items. All such data is transferred to the online library or data store 105, indexed and served from the data store if requested. The user viewing the screen may choose a search result 216 to add to the documents the user will be presenting or to otherwise place them in the meeting record.

Figure 3:
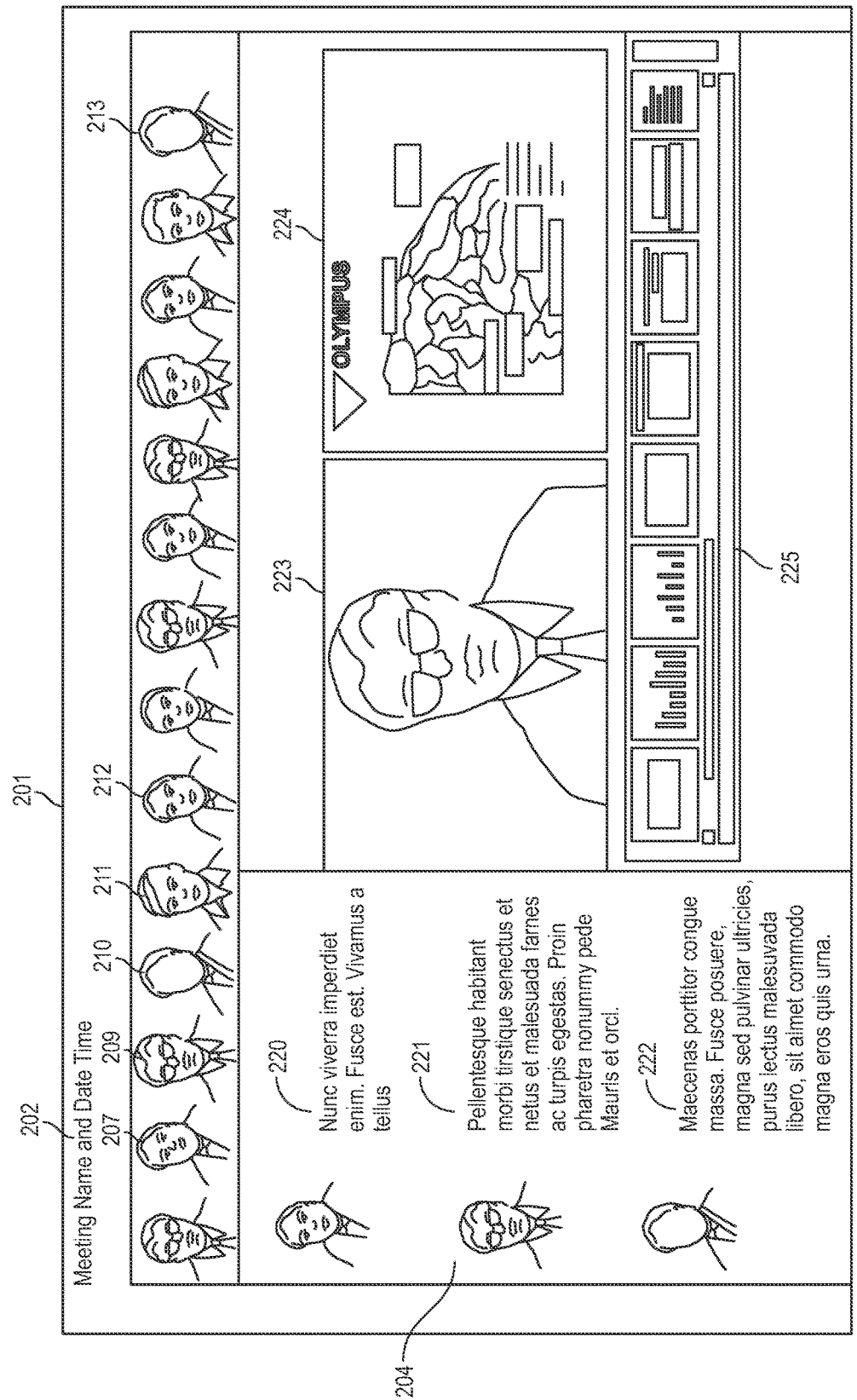
FIG. 3 is a diagram of the moderator screen showing interaction with persons querying the moderator and the current meeting display.

FIG. 3 shows the moderator screen during interaction with participants wishing to speak or otherwise bring the moderators attention to some point. Window 204 now contains icons of the participant sending the moderator messages 220, 221, 222. The moderator may select each message and respond to it, or may take some other action, such as placing the participant in the speaking list; adding an explanatory note to the meeting process, adding a document to the meeting documents, or similar actions.

Window 205 now shows the current meeting presentation which appears for every participant, with a video window 223 showing the current speaker, together with their position and links accessing other information relevant to the presenter. At 224 appears the document, which the presenter is currently speaking to, while window 225 shows all the documents relating to the meeting and which can be displayed in window 224 as the presenter wishes. The presenter can add documents, reports, video clips, web links, etc. to the documents appearing in window 225 as the meeting progresses, these being transferred to the data store and indexed as they are added.

Moderators may have additional controls to eject or bar persons from the meeting, or indeed to suspend them as a registered user.

Figure 4:
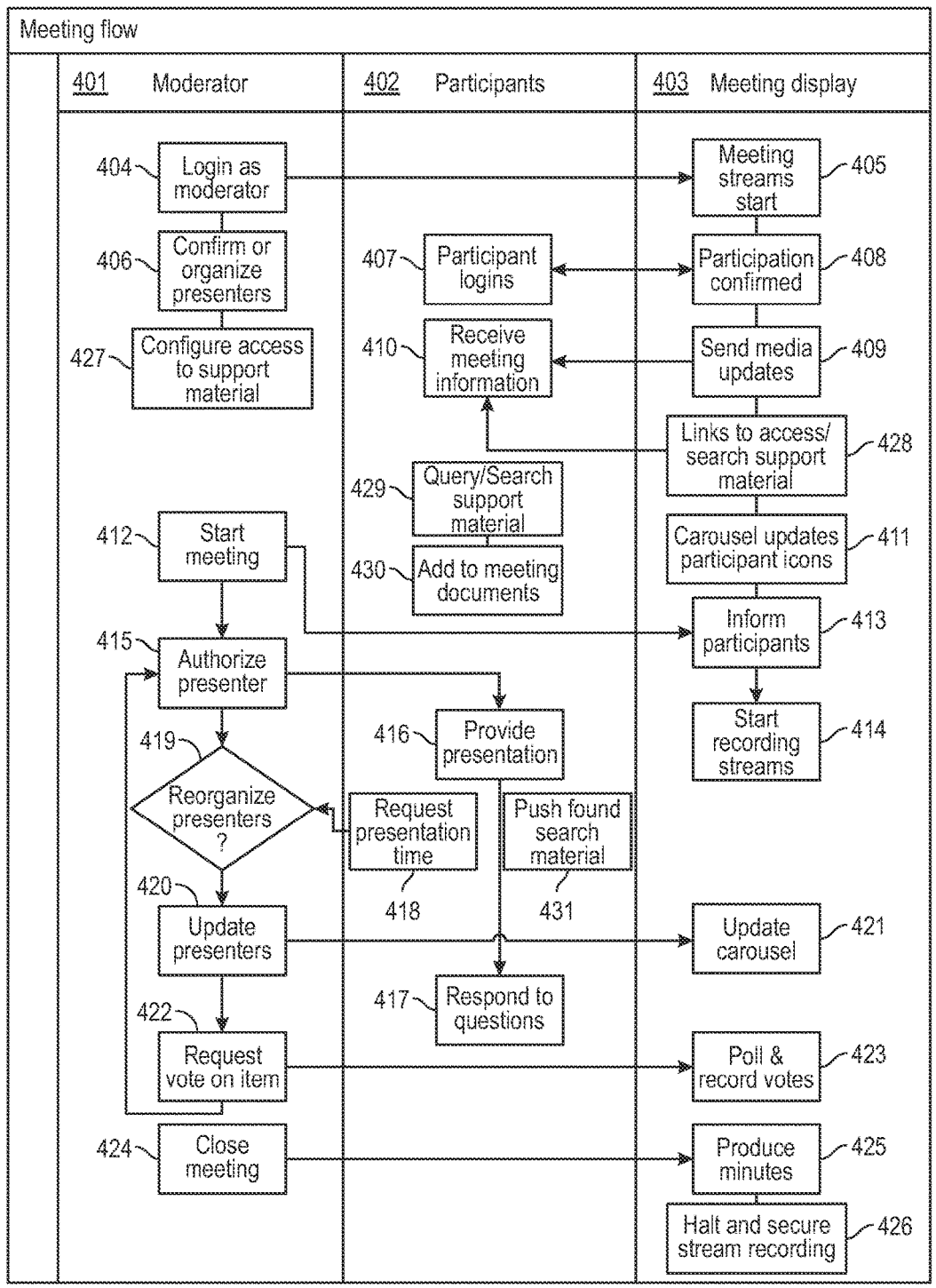
FIG. 4 is a flow diagram of the conference call management scheme as used for a meeting.

FIG. 4 shows a flow diagram of the interaction between the moderator, the participants, and the meeting display where the moderator actions are in column 401, the participants in column 402 and the meeting display actions in 403.

Prior to the login of the moderator the meeting exists in secure storage 105 as a scheduled item with a name, a start time, a prepared agenda, possibly some attached documents or multimedia files, at least one scheduled presenter and one or more potential participants.

At 404, the moderator logs in thereby causing the server 104 to start the meeting streams of data supply for the browser screens, messaging, video connection, and the storage of these streams at 405.

While the moderator confirms or organizes the presenters or any required documentation at 406 and adds links at 427 giving access to support material related to the meeting subject or accessible for searching by participants through a search engine, the meeting awaits the login of the participants at 407 and confirms their participation at 408 either by presenting the applicable meeting stream to them in the browser or by some other message.

If the participant has not already downloaded the applicable meeting documents, reports, multimedia files, etc. these are sent at 409 thus ensuring that each participant has the required meeting information at 410. This will include at 428 links, references, or access to any reports, files or a searchable repository, which may have access limited to allow searching of specific data only.

As each participant logs in the icon bar ("carousel" where it may be scrolled either way to return to the beginning) 203 updates at 411, slotting the icon of the participant in where priority demands. The user may at 429 query or otherwise search the linked or otherwise referenced information made available for the meeting and may add specific documents, clips, or links to the meeting documents at 430.

At the appointed time, or when the quorum set for the meeting is present, the moderator is able to start the meeting at 412 and the meeting display is updated to indicate to the participants that-the meeting is in session at 414. Full evidential recording of all streams sufficient to meet the requirements for the type of meeting may now also be commenced at 414. This may grade from a simple recording to warranted inviolable record of all facets of the meeting.

The moderator can now authorize the first presenter at 415 and this presenter provides a presentation as at 416 and responds to any questions at 417. The presenter may additionally push links to found search material, or the material itself, to the meeting participants at 431, the material being made prominent in window 225. Presentation is preferably with video inserted into the browser screen (depending on the resources available to a participant). Questions may be on an automatic queue system from the participants, with an indication in the carousel as to who is asking the question, or they may be moderated by the moderator, so that permission to ask a question must first be gained from the moderator before the questioner is added to the question sequence. Video from each questioner may be placed on screen during the questioning session.

Meanwhile the moderator may be responding to requests from participants for presentation time at 418, deciding whether to reorganize presenters at 419 and updating the presentation order at 420 so that the carousel may be updated for all participants at 421.

The moderator or chairman may request a vote on items at 422 if required, the system polling participants and recording their votes for display of the amalgamated result on screen at 423. When that presentation is complete, the moderator authorizes the next until all presentations are completed or the meeting time elapses.

At this time the moderator closes then meeting as at 424, the system produces a record of presenters, documents presented and audio and video recorded at 425 and halts and secures the multiple streams of the meeting at 426.

A later process may produce human authenticated minutes, which may be presented to meeting participants for confirmation by message.

Figure 5:
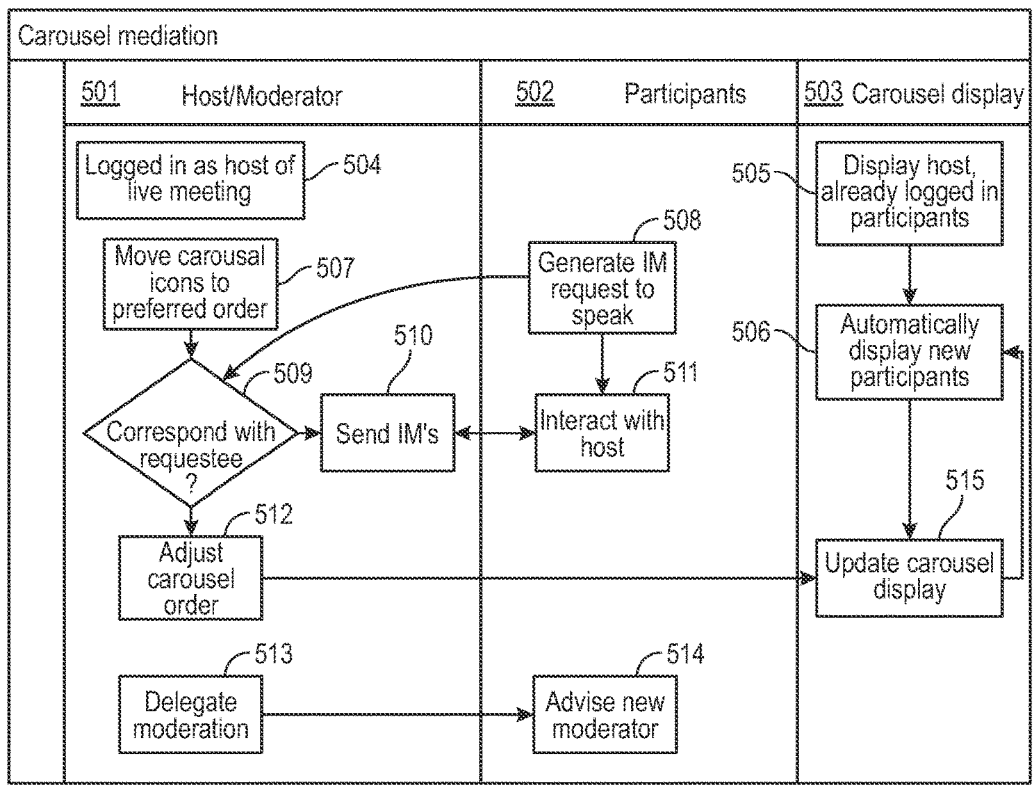
FIG. 5 is a flow diagram particularly of the participant icon "carousel."

FIG. 5 outlines in more detail the arrangement and variation of the items in the carousel. Prior to the meeting, the carousel is merely a list of the identity of the moderator or host of the meeting together with the known identities of persons presenting information at the meeting, and those of persons permitted to participate in the meeting. Column 501 outlines the actions of the host or moderator of the meeting, column 502 those of the participants, and column 503 the changes in the carousel display. At 504, the moderator logs in as host of the meeting or conference and the carousel display is made available at 505 showing the moderators icon and those of the already logged in participants. The moderator may move icons of persons to a preferred position at 507 and at 509 may respond to logged in participants who send an instant message (IM) to the moderator at 508. Correspondence with the participants may result in a change in order on the carousel at 512, either in response to a change in appearance order or merely to move the participant's icon from a normally off-screen to a normally onscreen position. The carousel order is updated for all participants at 515. The host or moderator may also appoint a delegate moderator or host at 513, with advisal to the new moderator at 514. The icon for that person will be moved on the carousel to adjacent that for the permanent host.

Figure 6:
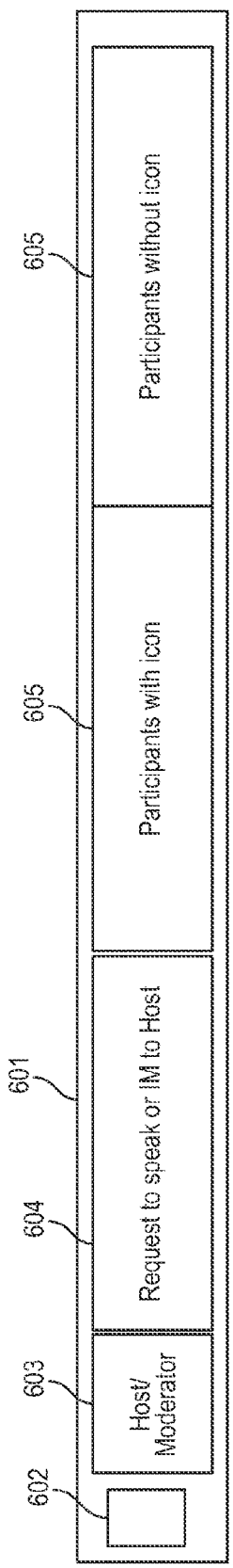
FIG. 6 is diagram of one version of the layout of the carousel.
Figure 7:
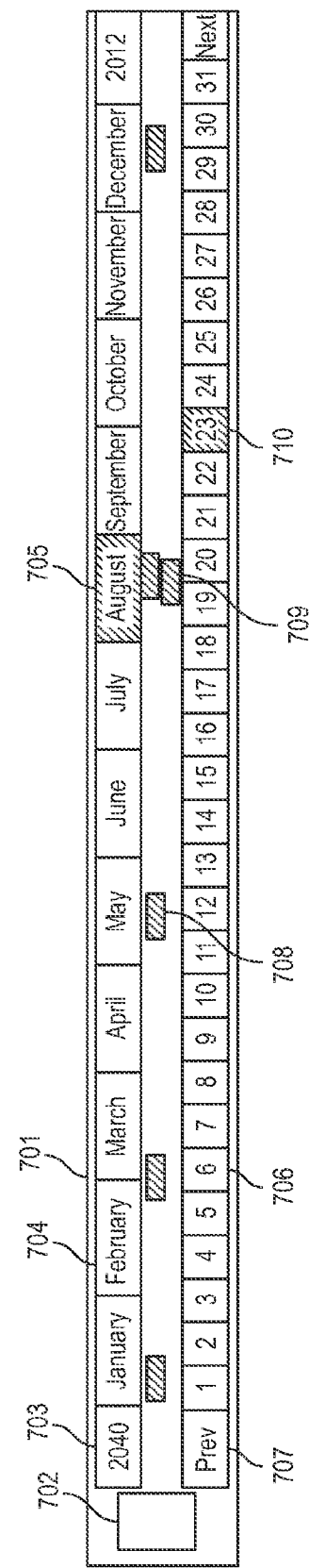
FIG. 7 is one version of a layout of a displayed conference series timeline.

FIG. 6 shows the general layout of the carousel icon bar at 601 with at 602 and icon, which may select an alternate to the carousel, such as the timeline of FIG. 7. At 603 appear the icon of the host and/or moderators, followed at 604 by the icons of those persons with requests to speak or those who have unactioned instant messages to the host. At 605, appear the icons of those who have images of themselves stored within the system, and at 606 default icons for those who have no images. Where the number of participants is large, some of the icons may be scrolled off screen.

FIG. 7 shows at 701 an alternate to the carousel icon bar as a timeline for meetings or conferences, which a participant has or will have access to. At 702 is an icon to allow switching to the carousel bar, at 703 a link to the previous years lists, at 704 a selectable month list, giving access to the list 706 of days within the month. The current day and month may be highlighted as at 705, 710. Between the two lists appear bars 708, 709 each representing a meeting within a month. The bars provide links to access information about a meeting or conference, such as times, subjects, attendees, background material, etc.

The above workflow may be implemented as software in any appropriate language, but will normally require the implementation of different tasks on different servers working as a homologate in order to accomplish the desired result. For instance, a chat session between the moderator and a participant will take place through a messaging server while a document will be made available from a document storage system by a document server.

The document storage system for the meeting should contain adequately indexed versions of the documents to be presented. Thus, the minutes of a previous meeting may have been transcribed or voice recognition techniques used to provide a searchable result from a presentation; any documents presented will have been indexed, as will any video clips, and any data will have been provided with embedded metadata to allow adequate searching of the data. In this way, participants can retrieve any information related to the meeting or collaboration discussion in a rapid and timely manner, providing improved productivity.

Participants for a meeting may range from any person who wishes to join the meeting (where the meeting is public) to a limited number of known persons (for instance the board of a company where the meeting is a board meeting). Participants must therefore be known to the system, and a typical user registration process may be followed with verification of the user permissions being required in order to determine which meetings they may be able to view the details of and have access to. In a commercial environment, user registration in order to participate in a company meeting may require verification by automatic email from the registration system to a company officer or web mediated moderated confirmation of a registration by a company officer.

Each participant has a profile, which typically includes their name, position, email, location, and local time, and time and date displays for the participant will show local times for the meeting.

As described the system uses a web browser as the interfacing application. Much of the interaction may rely on javascript code to cause a server to provide whatever information is required by a participant. The browser interface may be HTML or it may be a more facile interface such as SWF or Adobe Air™. In the latter case communication between the servers and the client machines may be by RTMP (Real Time Messaging Protocol), hosted for instance on a WebOrb server. Servers 104, which may form part of a virtual server cluster, serve whichever protocol is appropriate to the item in question using the appropriate server.

Equally, a specific video application can be provided, running on an operating system such as Windows, Android, or Linux to either provide greater security than is available from a browser or to allow facilities not available through a browser, such as native cross-platform operation.

The description assumes that the meeting streams are passed by standard secure TC/PIP protocol, but where, for instance, the meeting is of a large disseminated company the information may be sent via secure tunnels between venues through the internet.

Where the system is interfacing between two different methods (for instance a Java based message being sent to a Flex based recipient) the system provides the correct transformation.

The secure storage 105 in the instance of a meeting holds, for instance: [0079] Video Conferencing Recording [0080] Audio Conferencing Recording [0081] Peer to Peer Instant Messaging Text recording [0082] Document submission and storage via a secured file repository [0083] Shareholder real time voting Poll/Graph on key topics [0084] Shareholder voting data recording—for auditing [0085] Requests to speak—the virtual hands up from participants actions recorded [0086] Rejection/Blocking/Ejection of Participants registered and logged [0087] Full playback of any and all AGM/board meeting/shareholder meeting [0088] Video Conferencing Recording [0089] Audio Conferencing Recording [0090] Peer to Peer Instant Messaging Text recording [0091] Document submission and storage via a secured file repository [0092] Shareholder voting [0093] Requests to speak—the virtual hands up from participants actions recorded The record of the meeting is available both during and after the meeting, preferably by way of a timeline interface replacing the carousel icon bar. Selection of a required time provides access to the live recording of that time together with any documents associated with that time, and any relevant items appropriate to the items before the meeting at that time.

When no meeting is taking place or is selected for review the timeline acts as a calendar showing coming and past meetings. A hover link allows registering for meetings yet to come and typically the system will send an email confirming this.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example, the particular elements of the conference management system may vary dependent on the particular application for which it is used without variation in the spirit and scope of the present invention.

In addition, although the preferred embodiments described herein are directed to managing meetings in a secure evidential video conferencing system, it will be appreciated by those skilled in the art that variations and modifications are possible within the scope of the appended claims.

EXAMPLES

While the description relates to the invention in its application to a meeting of a company or similar organization the invention is equally appropriate to any virtual gathering of persons where some interaction by specific persons in the gathering with one or more presenters, or with the presentation venue, is appropriate. Thus, a virtual performance of a string quartet may be controlled by a "moderator/producer" as to the next number to be played, the balance of the instruments or to receive an indication of the amount of "applause" for a particular number. A teacher may expound to a "class" at disparate locations on a specialist subject with feedback from the "pupils" to monitor their understanding of the subject. A pop concert may be directed by the virtual "audience," thus dooming a singer to eternal repeats of the most popular number.

ADVANTAGES

The invention allows graduated participation by members of an "audience" in a group gathering of the "audience" where one or more persons may simultaneously or consecutively participate in what is being presented. It presents the "audience" to a "moderator" to organize the selection of the presenting member and organization of any supporting content required by the forthcoming presenter. It presents to all members of the audience the expected or changing order of presentation and allows individual querying of the attributes of the forthcoming presenter.

VARIATIONS

The description relates to a windowed display with an icon bar showing participants across the top, the icons appearing in the bar being limited to those most interactively associated with what is being presented as the main content. The order in which icons appear in the bar may be selected by the viewing participant or may be searched to allow a participant to determine if a specific person is taking part. The icon bar may be shifted at the viewer's option, or varied to have more than a single row of icons.

Selecting an icon may show links to the information which that participant wishes to bring to the conference, and may indicate which have been recently added or which have not yet been accessed by a particular participant.

INDUSTRIAL APPLICABILITY

The video conference management system of the invention is used in the presentation and control of video conferences for business or industry. The present invention is therefore industrially applicable.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A computerized method of managing a video conference and presenting video conference management information, comprising:
   providing a moderator interface on a display device, the interface simultaneously displays conference information in a prescribed manner, including:
      an icon bar within the interface that depicts a plurality of icons in a prioritized order comprising at least one speaker icon and thereafter icons for other participants of the conference, the speaker icons are arranged in an order that corresponds to the order of presentation within the conference; and
   authorizing the speakers to present in the prescribed order set forth in the icon bar, wherein the moderator can assign the prescribed order of the speaker through the moderator interface.

2. The method defined in claim 1, wherein the icons act as links providing access to communication among participants.

3. The method defined in claim 1, wherein the icon bar is scrollable to view all of the plurality of icons.

4. The method defined in claim 1, further comprising adjusting the order of the participant icons during the conference based on the degree of interactivity of the corresponding participants such that icons participants that are active during the conference will be prioritized higher than less active participants.

5. The method defined in claim 1, wherein icons associated with participants having personalized profiles are prioritized above participants having default profiles.

6. The method defined in claim 1, wherein the icon bar displays the plurality of icons in a linear alignment.

7. The method defined in claim 1, wherein the icon bar depicts a moderator icon.

8. The method defined in claim 7, wherein the position of moderator can be delegated during the conference and an icon of the delegate is appears adjacent to the moderator icon.

9. A video conference data storage and management system, comprising:
   a conference information storage system storing information to be presented or being presented at a video conference;
   a participant information system storing information relating to participants, including a moderator and speakers, of the video conference; and
   a conference control management system that provides a moderator interface on a display device, providing a moderator interface on a display device, the interface simultaneously displays conference information in a prescribed manner, including:
      an icon bar within the interface that depicts a plurality of icons in a prioritized order comprising at least one speaker icon and thereafter icons for other participants of the conference, the speaker icons are arranged in an order that corresponds to the order of presentation within the conference.

10. The system defined in claim 9, further comprising a conference recording system providing a record of proceedings at the conference.

11. The system defined in claim 9, wherein the moderator can assign the prescribed order of the speaker through the moderator interface, thereby modified the order of icon in the icon bar.

12. The system defined in claim 9, wherein the icon bar depicts a moderator icon, and the position of moderator can be delegated during the conference and an icon of the delegate is appears adjacent to the moderator icon.

13. The system defined in claim 9, wherein the conference control management system monitors interactivity of participants within the conference and adjusts the order of the participant icons within the icon bar based upon the monitoring step, such that icons for participants prioritized by degree of interactivity.

14. The system defined in claim 9, wherein icons associated with participants having personalized profiles are prioritized above participants having default profiles via the conference control management system.

* * * * *